C. F. WALLACE & M. F. TIERNAN.
APPARATUS FOR APPLYING GAS TO FLUIDS.
APPLICATION FILED MAR. 28, 1917.
1,285,496. Patented Nov. 19, 1918.
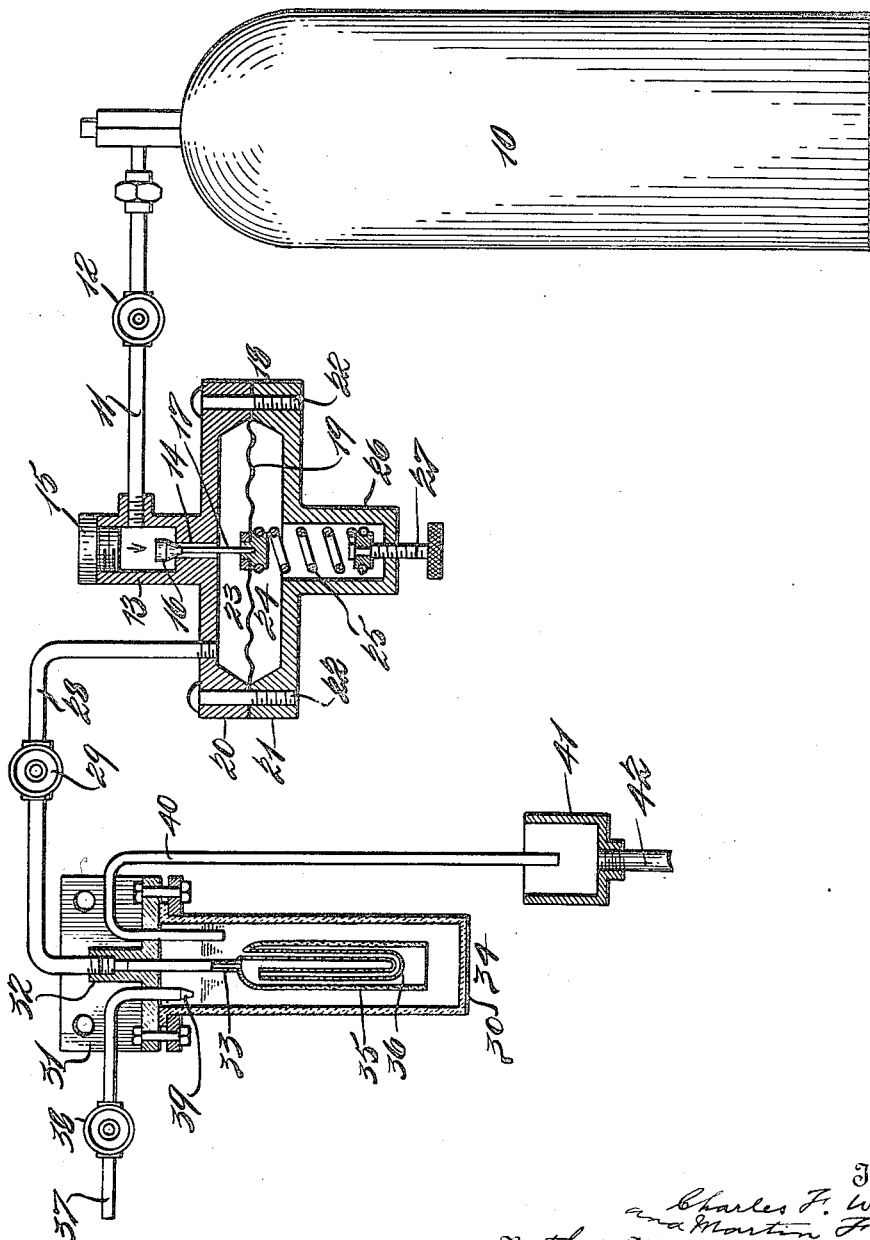

UNITED STATES PATENT OFFICE.

CHARLES F. WALLACE, OF NEW YORK, AND MARTIN F. TIERNAN, OF NEW ROCHELLE, NEW YORK.

APPARATUS FOR APPLYING GAS TO FLUIDS.

1,285,496.　　　　Specification of Letters Patent.　　Patented Nov. 19, 1918.

Application filed March 28, 1917. Serial No. 158,086.

*To all whom it may concern:*

Be it known that we, CHARLES F. WALLACE and MARTIN F. TIERNAN, citizens of the United States, residing at Tompkinsville, borough of Richmond, city and State of New York, and New Rochelle, county of Westchester, and State of New York, respectively, have invented certain new and useful Improvements in Apparatus for Applying Gas to Fluids, of which the following is a clear, full, and exact description.

This invention relates to processes of manipulating fluids, and is especially adapted for the purpose of applying chlorin gas to water to purify the water.

In processes of the prior art similar in some respects thereto, as where chlorin is applied to water to be sterilized, the flow of chlorin into the water to be sterilized has been produced by means of gas under pressure, as, for example, liquid chlorin in a container. This method necessitates that the apparatus for carrying the process into effect must be under pressure greater than atmospheric. Owing to the extreme corrosive action of chlorin in the presence of moisture, it is necessary that such apparatus should at all times be absolutely gas tight. Furthermore, any breakage occurring at any point in the circuit allows the chlorin to escape into the air, with resulting damage to life and property.

One of the objects of the invention is to cause a flowing stream of fluid to set up in a container a negative pressure or one less than atmospheric and thereby to induce a flow of gas into such container to combine with the fluid. Another object of the invention is to provide a more efficient and reliable means of handling chlorin gas in processes which involve its absorption by water, by supplying the gas to the water under the influence of a partial vacuum or negative pressure, and automatically regulating the flow of chlorin to and into the water with which it is to combine.

We have found it desirable to use an apparatus in which the chlorin flowing through a chlorin apparatus is at all times operated and controlled by the influence of negative pressure, and that this result be obtained by taking advantage of the negative pressures which can be produced by means of flowing water, which also automatically regulates the flow of chlorin into the water to be sterilized, so that when the water is not flowing, the chlorin also ceases to flow.

These being among the objects of the present invention, the same consists of the means of apparatus herein described and shown in the accompanying drawing, which represents the apparatus with as little detail as possible.

A container 10 holds liquid chlorin, or chlorin gas under pressure, and from it leads a pipe or line 11 having a control valve 12, said pipe leading to a valve chamber 13 which is provided with a valve orifice 14, and may be closed by means of a screw plug 15. A preferably conical valve 16 is arranged in the valve chamber 13 and its stem 17 passes through the valve orifice 14 so that the said valve may be moved against or away from the valve seat. The valve orifice 14 leads to a diaphragm chamber 18 which contains a flexible diaphragm 19. Preferably, the diaphragm chamber 18 is composed of two separate chambered sections 20, 21, between which the edge of the diaphragm 19 is clamped and held by means of fastenings 22. In this way the chamber 18 will be provided with two sub-chambers 23, 24, and the valve orifice 14 leads to the sub-chamber 23. Preferably also, the section 20 is made integral with the valve chamber 13.

A suitable force applied to the flexible diaphragm 19 tends to maintain the valve 16 upon its seat and thereby close the valve orifice, and the sensitiveness of the valve to bias it toward its closed position may be determined by means of a helical spring 25 located in a socket 26 upon the section 21, which spring is attached at one end to the central portion of the diaphragm 19, while the tension thereof may be regulated from the other end by means of a regulating screw 27 operating in socket 26. By the described means, the said valve may be set so as to be more or less sensitive to a given suction in the sub-chamber 23.

A line or pipe 28 leads from the sub-chamber 23 and is provided with a control valve 29. Said pipe 28 leads to an absorption tower or vessel, which is preferably similar in its essential parts to the corresponding features shown in our application, Serial No. 17,124 filed March 26, 1915. Said tower comprises a glass vessel 30 suspended in any suitable manner from a head or cap 31, and said cap is provided with a nipple 32 with which is connected the pipe 28 before mentioned. The opening through the nipple 32 leads to the hollow stem 33 of a hydraulic volumetric meter 34 which is introduced into the vessel 30. Preferably the parts of said meter are of glass so that its action is visible, and said meter comprises a pendant bell 35, above the open lower end of which is suspended an inverted siphon 36 which is attached at its upper end to the upper part of said bell. As described in said application, the meter is submerged in a body of water in the vessel, and the column of water within the bell 35 will be depressed by the incoming gas until the top of said column will reach a point approximately opposite the inner bend of the siphon, whereupon immediately the gas charge contained in the bell will be pressed out by the hydrostatic pressure of the water in the vessel, so that the said charge of gas will be discharged by the siphon into said water.

Water is supplied to the vessel 30 by means of a supply pipe 37 which is provided with a valve 38, and is terminated by a jet nozzle 39 which extends downwardly into the vessel 30, so that a jet of water may be discharged directly upon the body of water contained in the vessel. The vessel 30 is provided with a discharge siphon 40 for the solution which is made in said vessel, and the discharge leg of said siphon leads to a collecting receptacle 41 provided with a discharge pipe 42, said siphon discharging the solution freely into said receptacle.

The flow of water into the absorption vessel 30 is more restricted than the flow of the solution from the siphon 40, and this may be determined by having the nozzle 39 with a smaller orifice than the inlet end of the solution discharge siphon 40 or the valve 38 may be used to regulate the flow of water.

The operation is as follows: The apparatus is first set to a desired flow of chlorin and to a desired flow of water relatively thereto. When the water is charged into the vessel 30 to a sufficient amount, the lower end of the inlet portion of the solution discharge siphon 40 will be submerged in the vessel, and with the continued admission of water into the vessel, the siphon 40 will proceed to discharge the solution because of its well-known siphonic action. This will set up or establish a negative pressure in the system, which corresponds to the "head" or the weight of the column of water in the discharge leg of siphon 40. As soon as the negative pressure is established by the action of the siphon 40, this negative pressure acting upon the body of water in the vessel 30, and the column of water in the bell of the meter 34 will be transmitted through the line 28 and to the sub-chamber 23 of the diaphragm chamber, and will act upon the diaphragm 19 so as to open the valve 16. Immediately the said valve is opened, the gas will flow through the orifice 14, sub-chamber 23, pipe 29, and into the meter 34, which will act as more particularly described in our aforesaid copending application. It follows that as long as the water continues to flow into the absorption vessel, a negative pressure will be produced which will cause a continuous flow of the gas at atmospheric or less than atmospheric pressure, with the result that the objections heretofore mentioned are overcome. It is obvious that the degree of negative pressure in the circuit of the apparatus will be determined by the height of "head" in the discharge siphon 40 for the solution. The solution will be discharged continuously into the receiving vessel 41 and from there it may be piped as a minor flow to a major flow of water to be sterilized, in any well known manner.

It is obvious that the described apparatus may be applied to the treatment of any fluid with another fluid, or to the control of a fluid by the negative pressure of another fluid so that the first fluid may be conducted to a substance to be treated.

In this specification we use the term "negative pressure" in its ordinary and well known sense, that is to say, a pressure less than that of the atmosphere or what is commonly known as a partial vacuum.

What we claim as new is:

1. An apparatus for applying gas to fluids for forming a solution of the same comprising in combination a source of fluid under pressure, a mixing chamber into which the fluid is delivered, a source of gas, a siphon for drawing off a part of the fluid from the mixing chamber whenever the level of fluid therein rises to a certain point and a passage from the source of gas containing a valve which is opened by the negative pressure established by the siphoning off of the fluid.

2. An apparatus of the kind herein described comprising in combination a vessel for containing water, a source of water under pressure connected therewith, a siphon for drawing off a given proportion of the water whenever the latter rises in the vessel to a given level, a source of chlorin, a passage from the same leading into the upper portion of the water vessel, a valve therein and a diaphragm operated by the negative pressure produced by the siphoning off of the water for controlling said valve, whereby gas will be drawn into the water vessel only when water is flowing through the same.

3. In an apparatus of the kind described the combination of a vessel for containing water, means for introducing water into the same under pressure, a means for periodically drawing off a portion of the water at a faster rate than it is introduced whereby a negative pressure is produced in the upper part of the vessel, a source of chlorin gas and means controlled by such negative pressure for drawing said gas into the vessel to form a solution with the water therein.

4. In an apparatus of the kind described, the combination of a vessel for containing water, means for introducing water into the same under pressure, a means for periodically drawing off a portion of the water at a faster rate than it is introduced, whereby a negative pressure is produced in the upper part of the vessel, a source of chlorin gas, means for reducing it to substantially atmospheric pressure, and means controlled by the negative pressure in the vessel for drawing the chlorin into the vessel and measuring the amount of the same so introduced.

Signed at New York, N. Y., this 27" day of March, 1917.

CHARLES F. WALLACE.
MARTIN F. TIERNAN.